(12) United States Patent
Pannier et al.

(10) Patent No.: US 9,175,119 B2
(45) Date of Patent: Nov. 3, 2015

(54) POLYMERS

(71) Applicant: Ineos Europe AG, Vaud (CH)

(72) Inventors: Gaelle Pannier, Brussels (BE); Choon Kooi Chai, Overijse (BE)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/364,118

(22) PCT Filed: Dec. 7, 2012

(86) PCT No.: PCT/EP2012/074792
§ 371 (c)(1),
(2) Date: Jun. 10, 2014

(87) PCT Pub. No.: WO2013/087531
PCT Pub. Date: Jun. 20, 2013

(65) Prior Publication Data
US 2014/0329979 A1    Nov. 6, 2014

(30) Foreign Application Priority Data
Dec. 14, 2011   (EP) .................................... 11193461

(51) Int. Cl.
*C08F 210/16*   (2006.01)
*C08F 2/34*   (2006.01)
*C08F 4/659*   (2006.01)
*C08F 4/6592*   (2006.01)

(52) U.S. Cl.
CPC ................ *C08F 210/16* (2013.01); *C08F 2/34* (2013.01); *C08F 4/6592* (2013.01); *C08F 4/65912* (2013.01)

(58) Field of Classification Search
CPC ....... C08F 210/16; C08F 210/00; C08L 23/16
USPC .......................................... 526/348, 172, 130
See application file for complete search history.

(56) References Cited

U.S. PATENT DOCUMENTS

| | | | |
|---|---|---|---|
| 6,462,161 B1* | 10/2002 | Cady et al. ..................... | 526/348 |
| 8,242,220 B2* | 8/2012 | Chai .............................. | 526/126 |
| 8,772,426 B2* | 7/2014 | Chai et al. ..................... | 526/348.5 |
| 2002/0165330 A1 | 11/2002 | Cady et al. | |
| 2004/0077810 A1* | 4/2004 | Marechal ....................... | 526/183 |
| 2004/0102312 A1 | 5/2004 | McCullough et al. | |
| 2005/0255264 A1* | 11/2005 | Maziers ........................ | 428/35.7 |
| 2014/0329979 A1* | 11/2014 | Pannier et al. ................ | 526/127 |

FOREIGN PATENT DOCUMENTS

| | | | | |
|---|---|---|---|---|
| EP | 0 676 421 | A1 | 10/1995 | |
| EP | 1 935 909 | A1 | 6/2008 | |
| EP | 1 972 642 | A1 | 9/2008 | |
| EP | 2 348 057 | A1 | 7/2011 | |
| WO | WO 2011/089112 | A1 * | 7/2011 | ............ C08F 210/16 |

* cited by examiner

*Primary Examiner* — Rip A Lee
(74) *Attorney, Agent, or Firm* — Nixon & Vanderhye P.C.

(57) ABSTRACT

Copolymers of ethylene and α-olefins having (a) a density in the range 0.900-0.940 g/cm³, (b) a melt index MI$_2$ (2.16 kg, 190° C.) in the range 0.01-50 g/10 min, (c) a molecular weight distribution (Mw/Mn, by conventional GPC) in the range 2.0-4.5, (d) a comonomer partition factor, $C_{pf}$>1, and (e) a melt index MI$_2$ (2.16 kg, 190° C.) normalized Dow Rheology Index (DRI), [DRI/MI$_2$] in the range 3-20. The copolymers may be prepared using catalyst systems containing activating supports. The copolymers are suitably prepared in the gas phase preferably in a single reactor. The copolymers exhibit unique properties in particular with respect to their rheology.

29 Claims, 2 Drawing Sheets

POLYMERS

This application is the U.S. national phase of International Application No. PCT/EP2012/074792 filed Dec. 7, 2012 which designated the U.S. and claims priority to European Patent Application No. 11193461.8 filed Dec. 14, 2011, the entire contents of each of which are hereby incorporated by reference.

The present invention relates to novel polymers and in particular to novel copolymers of ethylene and α-olefins. In particular the present invention relates to novel copolymers prepared by use of activating supports in particular supports used in the presence of metallocene complexes.

BACKGROUND OF THE INVENTION

The use of the activating supports, in particular with metallocene catalysts, provide advantages for operation in both gas and slurry phase processes for the polymerization of ethylene or the copolymerization of ethylene and α-olefins having from 3 to 10 carbon atoms.

In recent years there have been many advances in the production of polyolefin homopolymers and copolymers due to the introduction of single site catalysts such as metallocene catalysts. Metallocene catalysts offer the advantage of generally a higher activity than traditional Ziegler catalysts and are usually described as catalysts which are single site in nature.

The above single site catalyst systems such as metallocene complexes may be used for the polymerization of olefins in solution, slurry or gas phase. When used in the slurry or gas phase the metallocene complex and/or the activator are suitably supported. Typical supports include inorganic oxides eg. silica or polymeric supports may alternatively be used.

Examples of the preparation of supported metallocene catalysts for the polymerization of olefins may be found in WO 94/26793, WO 95/07939, WO 96/00245, WO 96/04318, WO 97/02297 and EP 642536.

The above supported polymerization catalyst systems may in some cases lead to certain disadvantages such as cost, instabilities as well as poor morphology of the resultant polymers as well as problems with gels and the like when subsequently transformed into films and other articles.

In recent years attempts have been made to replace the activator or cocatalyst components of the supported polymerization catalyst systems by use of activating supports.

EP 906920 describes fluorine-containing activator solid supports for metallocenes wherein the surface of the support has been modified by aluminium (or magnesium) Lewis-acid sites of formula Al—F or AlF$_2$. The supports are prepared by a method comprising reaction of the surface —OH radicals with a functionalisation agent followed by fluorination.

Our copending application EP 10195224.0 describes activating supports prepared by use of fluorinated alcohols and phenols. Such supports may typically be used in the presence of metallocene complexes for polymerisations performed in both the slurry and gas phase.

SUMMARY OF THE INVENTION

We have now surprisingly found that in some circumstances the use of activating supports as a component of polymerization catalyst systems may lead to polymers having unique properties in particular with respect to their rheology and processability.

The presence of LCB can lead to an improved rheology. Thus, the polymers are more processable in the extruder and exhibit good bubble stability particularly suitable for film applications.

It is a particular advantage of the novel copolymers of the present invention that there is an excellent balance between the degree of long chain branching as indicated by the Dow Rheology Index (DRI) and the melt elasticity (elastic modulus, G') which is a function of both long chain branching and molecular weight distribution. This balance results in an advantageous combination of desired properties particularly when directed to film applications.

The good processability of the novel copolymers can also be characterized by a certain level of the Shear Thinning Index, SHI (2.1/210), which is a function of both long chain branching and molecular weight distribution, but is independent of molecular weight, Mw.

The novel copolymers are therefore particularly suitable for the production of films and sheets prepared using traditional methods well known in the art. Examples of such methods are film blowing, film casting and orientation of the partially crystallised product. The films exhibit good processability, improved optical and mechanical properties and good heat sealing properties.

EP 1360213 describes metallocene film resins having good mechanical properties, excellent optical properties and very good extrusion potential. The resins exhibit melt indices MI$_2$ the range 0.001 to 150 g/10 min and a high Dow Rheology Index (DRI) of at least 20/MI$_2$. The resins are suitably prepared from ethylene bis(4,5,6,7-tetrahydro-1-indenyl) zirconium dichloride/MAO catalyst systems.

U.S. Pat. No. 5,674,342 describes ethylene polymers having a DRI of at least 0.1 and preferably at least 0.3 and a melt flow ratio (I$_{10}$/I$_2$) in the range 8 to about 12. Specifically exemplified polymers exhibit DRI in the range 0.3-0.7 and molecular weight distributions (Mw/Mn) in the range 2.15-3.4.

Our earlier publication WO 06/085051 described copolymers of ethylene and alpha-olefins having broader molecular weight distributions (Mw/Mn) in the range 3.5 to 4.5. These copolymers exhibited a melt elastic modulus G' (G"=500 Pa) in the range 40 to 150 Pa and an activation energy of flow (Ea) in the range 28-45 kJ/mol but which had low or moderate amounts of LCB.

In another earlier publication WO 08/074689 (EP 1935909) we described novel copolymers of ethylene and alpha-olefins having a melt index MI$_2$ (2.16 kg, 190° C.) normalized Dow Rheology Index (DRI), [DRI/MI$_2$], typically less than 3 over a melt elastic modulus G' (G"=500 Pa) range of 40-150 Pa, but with a more balanced processability with improved properties.

Our recent publication WO 11/089112 described broad molecular weight distributions (Mw/Mn up to 20) novel copolymers of ethylene and alpha-olefins giving a melt index MI$_2$ (2.16 kg, 190° C.) normalized Dow Rheology Index (DRI), [DRI/MI$_2$]>2.65.

We have now developed novel copolymers of ethylene and alpha-olefins having a high melt index MI$_2$ (2.16 kg, 190° C.) normalized Dow Rheology Index (DRI), [DRI/MI$_2$], at narrower molecular weight distributions, for a more balanced processability with improved properties particularly those suitable for preparing films with an excellent balance of processing, optical and mechanical properties.

Thus according to a first aspect of the present invention there is provided a copolymer of ethylene and an α-olefin, said copolymer having (a) a density in the range 0.900-0.940 g/cm³,
(b) a melt index $MI_2$ (2.16 kg, 190° C.) in the range 0.01-50 g/10 min,
(c) a molecular weight distribution (Mw/Mn, by conventional GPC) in the range 2.0-4.5,
(d) a comonomer partition factor, $C_{pf}$>1, and
(e) a melt index $MI_2$ (2.16 kg, 190° C.) normalised Dow Rheology Index (DRI), [DRI/$MI_2$] in the range 3-20, The density is preferably the range 0.910-0.930 g/cm³ and most preferably in the range 0.915-0.925 g/cm³.

The melt index $MI_2$ (2.16 kg, 190° C.) in preferably in the range 0.1-25 g/10 min and most preferably in the range 0.5-5 g/10 min.

The molecular weight distribution (Mw/Mn, by conventional GPC) is preferably in the range 2.5-4.5, more preferably in the range 3.0-4.5 and most preferably in the range 3.0-4.0.

The copolymers have a Dow Rheology Index (DRI)≥6, preferably in the range 9-25, more preferably in the range 13-25 and most preferably in the range 13-20.

The [DRI/MI] relationship is preferably in the range 6-20 and more preferably in the range 6-18.

The copolymers according to the present invention exhibit a melt elastic modulus G'(G"=500 Pa) at 190° C. in the range 40-150 Pa, preferably in the range 65-150 Pa, more preferably in the range 70-120 Pa and most preferably in the range 70-105 Pa.

The copolymers according to the present invention exhibit specific rheological behaviour and processability characteristics that satisfy the following equation relating the Dow Rheology Index (DRI) and the Shear Thinning Index, SHI (2.1/210), $$SHI(2.1/210) \leq [0.2351 \times DRI] + C$$

where C has a value of 3.4, preferably a value of 3.0 and more preferably a value of 2.7.

The comonomer partition factor, $C_{pf}$ is preferably in the range 1.1-1.50, more preferably in the range 1.1-1.45.

The copolymers according to the present invention are preferably monomodal.

By monomodal is meant a composition prepared with a single catalyst in a polymerisation system. The polymerisation system may preferably comprise a single reactor but may also comprise several reactors, which may be connected in series or in parallel, provided that in all reactors the same polymerisation conditions are maintained. By the term single reactor is meant reactor zone which has the same composition. This is in contrast to a bimodal or multimodal composition prepared in two or more reactors in which different polymerisation conditions in the two or more reactors may lead to the formation of different polymers in each reactor. This also differs from multimodal compositions made in one or more reactors in which two or more catalysts are used for example wherein two or more catalysts of different composition are used such as a Ziegler catalyst and a metallocene catalyst or two different metallocene catalysts.

Thus according to another aspect of the present invention the copolymers are monomodal.

The novel copolymers of the present invention may suitably be prepared by use of polymerization catalyst systems comprising activating supports as described in our copending application EP 10195224.0.

The activating supports may suitably be prepared by the steps of
(a) combining (i) a fluorine-containing compound having a reactive group and (ii) an organometallic compound
(b) addition of a porous mineral oxide support material,
(c) heating the functionalized support from step (b) under an inert gas and then under an atmosphere comprising oxygen, and
(d) recovering the activating support.

The preferred fluorine-containing compounds have the formula:

$$R(Fn)-X$$

wherein
R is hydrocarbyl, substituted hydrocarbyl, heterohydrocarbyl or substituted heterohydrocarbyl with up to 20 non-hydrogen atoms,
n is 1-41, and
X is OH, SH or $NR'_2$, and
R' is hydrogen or hydrocarbyl,
Preferably R is hydrocarbyl and most preferably alkyl.
Preferably n is 1-6.
Preferably X is OH.

Fluorine-Containing Compound

Suitable compounds include fluorine-containing alcohols, phenols, thiols and amines.

Suitable aliphatic alcohols include 2,2,2-trifluoroethanol and 1,1,1,3,3,3-hexafluoropropan-2-ol.

The preferred alcohol is 2,2,2-trifluoroethanol.

Suitable aromatic alcohols include pentafluorophenol, 2-fluorophenol, 3-fluorophenol, 3.5-difluorophenol, 4-fluorophenol, 3,4,5-trifluorophenol and 4-(trifluoromethyl)phenol.

Suitable thiols include 2-fluorobenzenethiol, 3-fluorobenzenethiol, and 4-flurobenzenethiol.

Suitable amines include 2-bromo-6-fluoroaniline and 2-bromo-4,6-difluoroan line.

Organometallic Compound

The organometallic compound is typically selected from an alkylated derivative of aluminium, boron, lithium or magnesium.

Preferably it is selected from an alkylated derivative of aluminium or boron such as triethylaluminium or triethylboron.

Most preferred organometallic compounds are organoaluminium compounds. A most preferred organoaluminium compound is triethylaluminium (TEA).

Support Material

The porous mineral oxide is advantageously chosen from silica, alumina or mixtures thereof but preferably it is silica.

Suitable silicas are those having surface areas in the range 100 to 1000 m²/g, preferably in the range 200 to 600 m²/g.

Suitable silica have an average particle diameter between 15 micrometers and 150 micrometers (15 μm<d50<150 μm).

Suitable silicas include Grace Davison Sylopol 2229 and 2408 silicas or ES70 or CS2050 silicas from PQ Corporation.

The support material may be subjected to a heat treatment (calcination) to reduce the water content or the hydroxyl content of the support material. Prior to its use the support material may be subjected to treatment at 25° C. to 1000° C., preferably at 100° C. to 1000° C. and most preferably at 150° C.-850° C. under an inert gas flow or under reduced pressure.

Thermal Treatment

The functionalized support is subjected to a thermal treatment under an inert gas such as argon or nitrogen and is carried out a temperature in the range 100-600° C. and most preferably in the range 150-450° C.

The support is then further subjected to treatment under an atmosphere comprising oxygen at temperature in the range 70-600° C., preferably in the range 100-600° C. and most preferably in the range 150-450° C.

The atmosphere may comprise air or pure oxygen or mixtures thereof.

The aforementioned activating supports may suitably be used as components of olefin polymerization catalyst systems and as such may be combined with polymerization catalysts, in particular comprising transition metal compounds.

The polymerisation catalyst may typically be a transition metal complex of Groups 3 to 12 of the Periodic Table of Elements (IUPAC Version). Examples of such complexes are well known in the art.

There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the his (cyclopentadienyl) and mono(cyclopentadienyl) complexes have been described in WO 96/04290 and WO 95/00526 respectively.

The above metallocene complexes have typically been utilised for polymerization in the presence of a cocatalyst or activator. Typically activators are aluminoxanes, in particular methyl aluminoxane or alternatively may be compounds based on boron compounds.

Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479, EP 418044 and EP 551277.

More recently other single site catalyst systems have been developed. For example based on metal complexes comprising late transition metals such as iron, cobalt, ruthenium and manganese.

Examples of such compounds are described in WO 98/27124, WO 99/12981, EP 1015501 and EP 1276777 and may be illustrated by [2,6-diacetylpyridinebis(2,6-diisopropylanil)FeCl$_2$], 2.6-diacetylpyridinebis(2,4,6-trimethylanil)FeCl$_2$ and [2,6-diacetylpyridinebis(2,6-diisopropylanil)CoCl$_2$].

Chem Rev 2003, 103, 283-315, Chem Rev 2000, 100, 1169-1203 and AngewChemInt Ed 1999, 38, 428-447 provide further details of suitable metallocene complexes and other single site catalysts.

Other catalysts include derivatives of Groups 3-4 or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group 14 of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalysts of the present invention comprise bulky ligand compounds also referred to as metallocene complexes containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

$$L_xMQ_n$$

where L is a cyclopentadienyl ligand, M is a Group 4 metal, Q is a leaving group and x and n are dependent upon the oxidation state of the metal.

Typically the Group 4 metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridgedeg. bis(cyclopentadienyl) zirconium dichloride, bis(pentamethyl)cyclopentadienyl dichloride, or may be bridged eg. ethylenebis(indenyl) zirconium dichloride or dimethylsilyl(indenyl) zirconium dichloride.

Other suitable bis(cyclopentadienyl) metallocene complexes are those bis(cyclopentadienyl)diene complexes described in WO 96/04290. Examples of such complexes are bis(cyclopentadienyl) zirconium (2.3-dimethyl-1,3-butadiene) and ethylene bis(indenyl) zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

$$CpMX_n$$

wherein Cp is a single cyclopentadienyl or substituted cyclopentadienyl group optionally covalently bonded to M through a substituent, M is a Group 4 metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SiR*7, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido)dimethyl(tetramethyl-$\eta^5$-cyclopentadienyl) silanetitanium dichloride and (2-methoxyphenylamido)dimethyl(tetramethyl-$\eta^5$-cyclopentadienyl) silanetitanium dichloride.

Other suitable monocyclopentadienyl complexes are those comprising phosphinimine ligands described in WO 99/40125, WO 00/05237, WO 00/05238 and WO00/32653. A typical example of such a complex is cyclopentadienyl titanium [tri(tertiary butyl)phosphinimine]dichloride.

Another type of polymerisation catalyst suitable for use in the present invention are monocyclopentadienyl complexes comprising heteroallyl moieties such as zirconium (cyclopentadienyl)tris(diethylcarbamates) as described in U.S. Pat. No. 5,527,752 and WO 99/61486.

Particularly preferred metallocene complexes for use in the preparation of the supported catalysts of the present invention may be represented by the general formula:

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cisdiene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R'')— or —P(R'')— wherein R'' is $C_{1-10}$ hydrocarbyl.

Most preferred complexes are amidosilane- or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl)dimethyl silanetitanium-$\eta^4$-1.3-pentadiene.

The loading (transition metal) in the supported catalysts of the present invention is typically in the range 0.1 μmol/g to 1 mmol/g.

The polymerization catalyst and activating supports may be combined in any suitable manner.

Preferably the activating support and the polymerization catalyst are combined in a suitable solvent.

The activated supported catalyst system may optionally be used in the presence of scavenger material such as an organometallic compound.

Preferably the organometallic compound is an organoaluminium compound.

A most preferred organoaluminium compound is triisobutylaluminium.

According to another aspect of the present invention there is provided copolymers of ethylene and α-olefins as hereinbefore defined said copolymers prepared by use of a catalyst system for the polymerisation of olefins comprising
(a) a transition metal compound, and
(b) an activated support as hereinbefore defined or prepared by the process defined above.

The preferred activated support is a fluorinated support.

The preferred support material is silica.

The preferred transition metal compound is a metallocene.

The copolymers of the present invention are most suitably prepared in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 1-octene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Preferred α-olefin is 1-hexene.

The novel copolymers of the present invention are preferably prepared in the gas phase. A preferred process is performed in a single reactor.

A particularly preferred process is a continuous process.

BRIEF DESCRIPTION OF THE DRAWINGS

The invention is further described with reference to the accompanying drawings, in which.

The present invention will now be further illustrated with reference to the following Examples:

EXAMPLES

Method for Elemental Analyses
(a) Fluoride

The fluoride content was determined by potentiometric analysis using a selective electrode. For this purpose the sample was prepared by Wurzschmitt combustion followed by acidic work-up. These methods are well known in the art.

The principle of combustion according Wurzschmitt lies in the quantitative conversion of fluorinated species into inorganic fluorides following a combustion reaction that takes place explosively in an airtight pure nickel bombs in which was introduce the sample, ethylene glycol to the ignition, and sodium peroxide as an oxidant.

The combustion residues are taken up in deionized water. The excess of sodium peroxide is hydrolyzed. The hydrogen peroxide formed is decomposed by adding a cobalt salt and a gentle boil. Once the residual solution is brought to the required pH (~5 with $HNO_3$), the quantity of fluoride ions in the solution is determined via selective electrode. The assay is performed by external calibration (potential versus log of the concentration of fluoride). Standard solutions (prepared from NaF) and samples are measured under the same conditions.

The addition of a suitable buffer (cyclohexylènediaminetetraacetic acid) is used to adjust the pH to fix the ionic strength of the solution and break the complexed molecules thereby measuring the concentration of fluoride ions.

From the potentials measured in the samples, the concentrations of fluoride ions are then calculated using the parameters of the calibration curve previously established.

(b) Aluminium

Aluminium content was determined by X-ray Fluorescnece Spectroscopy. For this purpose the sample was calcined in a Pt—Au crucible in the presence of lithium tetraborate. At a temperature of between 1000 and 1100° C., the catalyst is dissolved in the molten borate. The resulting homogeneous glass is shaped into discs which are examined in a X-ray fluorescence spectrometer The instrument calibration is performed with tetra-borate glasses containing lithium sales of elements to be determined in known amounts.

Preparation of Activating Support S2
(a) Thermal Treatment of Silica

The silica (CS2050 from PQ Corporation) was subjected to the following heating procedure under nitrogen flow in 15 g batches
  from 30° C. to 100° C. in one hour
  from 100° C. to 130° C. in 30 minutes
  from 130° C. to 250° C. in one hour
  maintained at 250° C. during four hours The resulting silica has a surface silanol concentration of 2.5 mmol per gram when activation temperature is 250° C.

(b) Reaction of 2,2,2-Trifluoroethanol with Organoaluminium Compound

To 45 mL of triethylaluminum (1 M in dry hexane, 45 mmoles) at 0° C. was added 3.22 ml of 2,2,2-trifluoroethanol (4.51 g, 45 mmoles) at 0° C. by dropwise addition and the mixture was stirred for one hour at 0° C. to yield product B.

(c) Fuctionalization of Support

To a suspension of 15 g of above calcined silica was added 45 mmoles of B (1.2 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as follows:
Heated Nitrogen Fluid Bed:
  from 30° C. to 130° C. in one hour
  maintained at 130° C. during one hour
  from 130° C. to 450° C. in one hour
  maintained at 450° C. during four hours
Heated Dry Air Fluid Bed:
  from 30° C. to 130° C. in one hour
  maintained at 130° C. during two hour
  from 130° C. to 450° C. in one hour
  maintained at 450° C. during eight hours Preparation of Activating Support S3
(a) Thermal Treatment of Silica The silica (CS2050 from PQ Corporation) was subjected to the following heating procedure under nitrogen flow in 15 g batches
  from 30° C. to 100° C. in one hour
  from 100° C. to 130° C. in 30 minutes
  from 130° C. to 450° C. in one hour
  maintained at 450° C. during four hours The resulting silica has a surface silanol concentration of 2.1 mmol per gram when activation temperature is 450° C.
(b) Reaction of 2,2,2-Trifluoroethanol with Organoaluminium Compound To 20.3 mL of triethylaluminum (1 M in dry hexane, 20.3 mmoles) at 0° C. was added 1.45 mL of 2,2,2-trifluoroethanol (2.03 g, 20.3 mmoles) and the mixture was stirred for one hour at 0° C. to yield product B.
(c) Fuctionalization of Support To a suspension of 8 g of above calcined silica was added 20.3 mmoles of B (1.2 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as described in example 1.
Preparation of Activating Support S4
(a) Thermal Treatment of Silica The silica (CS2050 from PQ Corporation) was subjected to the following heating procedure under nitrogen flow in 15 g batches
   from 30° C. to 100° C. in one hour
   from 100° C. to 130° C. in 30 minutes
   from 130° C. to 250° C. in one hour
   maintained at 250° C. during four hours The resulting silica has a surface silanol concentration of 2.5 mmol per gram when activation temperature is 250° C.
(b) Reaction of 1,1,1,3,3,3-Hexafluoropropan-2-ol with Organoaluminium Compound To 42.7 mL of triethylaluminum (1 M in dry hexane, 42.7 mmoles) at 0° C. was added 3.57 mL of 1,1,1,3,3,3-hexafluoropropan-2-ol (5.8 g, 34.4 mmoles) by dropwise addition and the mixture was stirred for one hour at 0° C. to yield product C.
(c) Fuctionalization of Support To a suspension of 14.28 g of above calcined silica was added 34.4 mmoles of C (1.04 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as described in example 1.
Preparation of Activating Support S5
(a) Thermal Treatment of Silica The silica (CS2050 from PQ Corporation) was subjected to the following heating procedure under nitrogen flow in 15 g batches
   from 30° C. to 100° C. in one hour
   from 100° C. to 130° C. in 30 minutes
   from 130° C. to 450° C. in one hour
   maintained at 450° C. during four hours The resulting silica has a surface silanol concentration of 2.1 mmol per gram when activation temperature is 450° C.
(b) Reaction of 1,1,1,3,3,3-hexafluoropropan-2-ol with Organoaluminium Compound To 15.4 mL of triethylaluminum (1 M in dry hexane, 15.4 mmoles) at 0° C. was added 1.61 mL of 1,1,1,3,3,3-hexafluoropropan-2-ol (2.6 g, 15.5 mmoles) and the mixture was stirred for one hour at 0° C. to yield product C.
(c) Fuctionalization of Support To a suspension of 6.04 g of above calcined silica was added 15.2 mmoles of C (1.2 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as described in example 1.
Preparation of Comparative Support CE A support was prepared using the following procedure according to WO 2007/014889:
   silica dehydroxylation at 450° C. under nitrogen fluid bed (2.1 mmol of silanol groups/g)
   silica alkylation with triethylaluminum (2 equivalents/silanol groups)
   washings with an alkane and drying under vacuum
   heated nitrogen fluid bed, heated dry air fluid bed and finally heated in a nitrogen fluid bed with 10 wt % of $(NH4)_2SiF_6$.
Elemental Analyses Summary:

| Support | Activation temp of silica (° C.) | F content (wt %) | Al content (wt %) | F/AL ratio (mol/mol) |
|---|---|---|---|---|
| S2 | 250 | 7.7 | 4.9 | 2.2 |
| S3 | 450 | 6.7 | 4.7 | 2.04 |
| S4 | 250 | 8.7 | 5.5 | 2.23 |
| S5 | 450 | 7.9 | 4.9 | 2.26 |
| CE | 250 | 7.0 | 5.9 | 1.68 |

1. Catalysts Formulations:

The supports S2 and S4 were used to formulate two catalysts, following the same synthesis pathway:

A premix of $(C_5Me_4SiMe_2N^tBu)Ti(\eta^4\text{-}1,3\text{-pentadiene})$ (2.525 mM in hexane) and triisobutylaluminium (1 M in hexane) was prepared at room temperature [Al/Ti mol/mol=50]. A portion of this solution was added to 100 mg activating support to reach a Ti loading of 30 μmol Ti/gram of activating support. After a reaction time of 30 minutes the solvent was removed under vacuum and a dry catalyst powder was obtained.

Another catalyst was formulated using the comparative support as follows:

A premix of $(C_5Me_4SiMe_2N^tBu)Ti(\eta^4\text{-}1,3\text{-pentadiene})$ (2.525 mM in hexane) and triisobutylaluminium (1 M in hexane) was prepared at room temperature {Al/Ti (mol/mol=50]. A portion of this solution was added to 100 mg activating support to reach a Ti loading of 30 μmol Ti/gram of activating support. After a reaction time of 60 minutes the catalyst was washed 5 times with dry hexane solvent and the solvent removed under vacuum and a dry catalyst powder was obtained (CE 4).
2. Polymerization Conditions:

Polymerization trials were performed at 10 bar of ethylene pressure at 80° C. for 60 minutes. Alkylated silica (SiOH/TEA) was injected as scavenger prior to catalyst addition. A dry salt was used as a seed bed. Catalysts were injected into the reactors at 80° C. with an isobutane flush. Activating support-based catalysts were suspended in mineral oil prior to injection.

Hydrogen and hexene were regulated by use of a mass spectrometer in order to keep $H_2/C_2$ and $C_6/C_2$ molar ratios constant at respectively 0.13 and 0.55 mol/mol.

An internal reference supported catalyst (silica supported metallocene catalyst system prepared using the procedure according to WO 05/019275) was also studied (CE3).

3. Polymerization Results:

TABLE 1

| Example | Support (mg) | Ti (μmol) | Productivity (g/g) | Activity (kg/mmol/Ti/hr) |
|---|---|---|---|---|
| 1 | S2 (24 mg) | 0.7 | 475 | 16.29 |
| 2 | S4 (29.9 mg) | 0.9 | 478 | 15.89 |
| CE3 | internal reference (23 mg) | 1.4 | 461 | 7.57 |
| CE4 | CE (25 mg) | 0.75 | 500 | 16.67 |

The properties of the novel copolymers of the present invention (Examples 1 and 2) as well as a copolymer prepared from the above comparative supports (CE3 and CE4) as well as several examples from the prior art (CE 5-7) are shown in Table 2.

TABLE 2

|  | Ex 1 | Ex 2 | CE3 | CE4 | CE5 | CE6 | CE7 |
|---|---|---|---|---|---|---|---|
| Density (g/cm$^2$) | 0.9229 | 0.9252 | 0.9208 | 0.9234 | 0.9191 | 0.919 | 0.9398 |
| MI$_2$ (2.16 kg/190° C.) | 1.00 | 0.76 | 0.87 | 0.18 | 1.1 | 1.17 | 0.62 |
| SHI (2.1/210) at 190° C. | 5.29 | 5.73 | 3.74 | 6.37 | 4.38 | 3.60 | 6.29 |
| Dow Rheology Index (DRI) at 190° C. | 13.5 | 13.7 | 0.402 | 3.9 | 1.152 | 0.256 | 11.7 |
| DRI/MI$_2$ | 13.5 | 18.0 | 0.462 | 21.5 | 1.047 | 0.219 | 18.9 |
| G'(G" = 500 Pa), (Pa) at 190° C. | 98 | 104 | 44 | 133 | 59 | 43.5 | 98 |
| Ea (kJ/mol) at 190° C. | 31.9 | 31.0 | 31 |  |  |  |  |
| Mw/Mn (Conventional GPC) | 3.3 | 3.4 |  | 5.6 | 3.9 | 3.7 | 4.8 |
| Comonomer Partition Factor, C$_{pf}$ | 1.40 | 1.23 | 1.24 |  |  |  | 1.52 |

CE3 - based on supported catalyst prepared according to WO 05/019275.
CE4 - based on support prepared according to WO 2007/014889
CE5 - based on example 3 from WO 2006/085051
CE6 - based on example 5 from WO 2008/074689
CE7 - based on example 4 from EP 2348057

CE4 represents a copolymer prepared by use of a catalyst system comprising an activating support prepared by a different method to those of the present invention. CE3, CE5 and CE6 represent copolymers prepared by use of silica supported metallocene catalyst systems activated by ionic activators. CE7 represents a polymer prepared in a dual reactor slurry phase process.

Polymer Properties
Methods of Test (Polymers)
Melt index: MI$_2$ (190° C./2.16 kg) was measured in accordance with the procedures of ISO 1133 at 190° C. using loads of 2.16 kg.
Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.
Dynamic Rheological Analysis
To characterize the rheological behavior of substantially linear ethylene polymers, S Lai and G. W. Knight introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (ANTEC '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI = [365000(\tau_0/\eta_0) - 1]/10$$

wherein $\tau_0$ is the characteristic relaxation time of the material and $\eta_0$ is the zero shear rate complex viscosity of the material. The DRI is calculated by least squares fit of the rheological curve (dynamic complex viscosity $\eta^*(\omega)$ versus applied frequency ($\omega$) e.g., 0.01-100 rads/s) as described in U.S. Pat. No. 6,114,486 with the following generalized Cross equation, i.e.

$$\eta^*(\omega) = \eta_0/[1 + (\omega \cdot \tau_0)^n]$$

Wherein n is the power law index of the material, $\eta^*(\omega)$ and $\omega$ are the measured complex viscosity and applied frequency data respectively.

Dynamic rheological measurements are carried out, according to ASTM D 4440, on a dynamic rheometer (e.g., ARES rheometer by TA Instruments) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

The values of storage (or elastic) modulus (G'), loss (or viscous) modulus (G"), complex modulus (G*), complex viscosity ($\eta^*$) and tan δ (the ratio of loss modulus and storage modulus, G"/G') were obtained as a function of frequency (ω) at a given temperature (e.g., 190° C.).

Measurements of Melt Elastic Modulus G'(G"=500 Pa) and Shear Thinning Index SHI(2.1/210) at 190° C.:

The frequency sweep (FS) experiment is then carried out at 190° C. using the above appropriately selected strain level and the dynamic rheological data thus measured are then analysed using the rheometer software (viz., Rheometrics RHIOS V4.4 or TA Orchestrator Software) to determine the melt elastic modulus G'(G"=500 Pa) at a constant, reference value (500 Pa) of melt viscous modulus (G").

Shear thinning index (SHI) value is defined as the ratio of two complex viscosities ($\eta^*$) calculated at two reference values of complex modulus (G*). The shear thinning index SHI (2.1/210) is obtained by calculating the complex viscosities $\eta^*(2.1\ kPa)$ and $\eta^*(210\ kPa)$ at a constant value of complex modulus of 2.1 kPa and 210 kPa, respectively, that is, SHI (2.1/210)=$\eta^*(2.1\ kPa)/\eta^*(210\ kPa)$.

Flow Activation Energy (Ea) Measurement

The bulk dynamic rheological properties (e.g., G', G" and $\eta^*$) of all the polymers were then measured as a function of frequency (ω) at 170°, 190° and 210° C. At each temperature, scans were performed as a function of angular shear frequency (from 100 to 0.01 rad/s) at a constant shear strain appropriately determined by the above procedure.

The dynamic rheological data was then analysed using the Rheometrics Software (TA Orchestrator). The following conditions were selected for the time-temperature (t-T) superposition and the determination of the flow activation energies ($E_a$) according to an Arrhenius equation, $a_T=\exp(E_a/kT)$, which relates the shift factor ($a_T$) to $E_a$:

Rheological Parameters: G'(ω), G"(ω) & $\eta^*(\omega)$
Reference Temperature: 190° C.
Shift Method: 2D (i.e., horizontal & vertical shifts) Minimisation
Calculation Method: Residual Minimisation
Shift Accuracy: High
Interpolation Mode: Cubic Spline High Temperature Gel Permeation (Size Exclusion) Chromatography Analysis by Calibration (Conventional GPC) for Apparent Molecular Weight Distribution Determination Apparent molecular weight distribution and associated averages, uncorrected for long chain branching, were determined by Gel Permeation (or Size Exclusion) Chromatography according to ISO16014-1, ISO 16014-2 and 16014-4, using a PL 220 of Polymer Laboratories with 4 WATERS STYRAGEL HMW 6E columns of 30 cm in length and 1 Waters Styragel 4.6×30 mm guard column and a differential refractometer detector. The solvent used was 1,2,4 Trichlorobenzene at 150° C., which is stabilised with BHT, of 0.2 g/liter concentration and filtered with a 0.45 μm Osmonics Inc. silver filter. Polymer solutions of 0.8 g/liter concentration were prepared at 160° C. for one hour with stirring only at the last 30 minutes. The nominal injection volume was set at 400 μl and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters $k_{ps}=1.21\times 10^{-4}$ dl·g$^{-1}$, $\alpha_{ps}=0.707$, $k_{pe}=4.06\times 10^{-4}$ dl·g$^{-1}$, $\alpha_{pe}=0.725$. The calibration curve $Mw_{PE}=f(V)$ was then fitted with a first order linear equation. All the calculations are done with Millennium 3.2 software from Waters.

Determination of $C_{pf}$ (a) Comonomer or Short Chain Branching (SCB) Distribution by GPC/IR Measurement of Comonomer (SCB) Content vs. Molecular Weight The comonomer content as a function of molecular weight was measured by a coupling a Polymer Char IR5 MCT detector to its Gel Permeation Chromatograph (GPC) with a transfer line thermally controlled at 150° C. A GPC-IR Control Software from Polymer Char was used to control and monitor the process, while the molecular mass distribution and short chain branching distribution calculations were performed with its GPC One software. The IR5 MCT is an infrared detector with high temperature flow through cell, which incorporates interference filters at five different wavelengths and high sensitivity thermoelectrically cooled mercury cadmium telluride detector (MCT).

The set-up, calibration and operation of this system together with the method for data treatment are summarised below:

Preparation of Polymer Solution:
Polymer Concentration: 1 g/l
Solvent: 1,2,4 trichlorobenzene stabilized with 300 ppm of BHT
Device: Polymer Char GPC-IR autosampler
Dissolution temperature: 160° C.
Duration: 1 h GPC Conditions
Columns set: 4 columns (20 microns) Polymer Labs
Mobile Phase: 1,2,4 trichlorobenzene stabilized with 300 ppm of BHT
Oven Temperature: 150° C.
Flow rate: 1 ml/min
Injected Volume: 400 μl Calibration
Molecular Mass Calibration A relative calibration was constructed using 12 polystyrene standards from PSS (Polymer Standard Service). Eight solutions were prepared in 1,2,4 trichlorobenzene stabilized with 300 ppm of BHT, combining the standards as follows:

| PS Standard | Molecular Weight | Weight (mg) in 8 ml TCB |
|---|---|---|
| PSS-A | PS 277.000 | 4 |
|  | PS 8400 | 16 |
| PSS-B | PS 4.410.000 | 2 |
|  | PS 17.600 | 16 |
| PSS-C | PS 2.520.000 | 4 |
|  | PS3250 | 16 |
| PSS-D | PS 1.210.000 | 4 |
|  | PS 1250 | 16 |
| PSS-E | PS 8.910.000 | 2 |
|  | PS 130.000 | 8 |
| PSS-F | PS 549.000 | 4 |
|  | PS 66.000 | 8 |
| PSS-G | PS 34.800 | 8 |
| PSS-H | PS 682 | 8 |

The elution volume, V, was recorded for each PS standard and a calibration curve was established for polystyrene. The PS molecular weight was then converted to PE equivalent using the Q-factor method as described by Sadao Mori and Howard G. Barth (in "Size Exclusion Chromatography", Springer Laboratory, 1999, ISBN 978-3-540-65635-7) as:

$Mw\ PE = (PS\ equivalent\ Mw) \times [(Q\ factor\ of\ PE)/(Q\ factor\ of\ PS)]$ The Mw PE calibration curve was constructed from the experimentally determined Q-factors with the relationship as:

$Mw\ PE = PS\ equivalent\ Mw \times 0.4316.$

It is controlled against standard polyethylene NBS1475.

Calibration IR for Short Chain Branching (SCB)

The short chain branching (SCB) calculation is obtained by calibrating the IR5 detector signal with a series of Metallocene based ethylene-octene copolymer standards, from Polymer Char, identified as follows:

| Polymer Char ID | Density | $MI_2$ | Average % Wt | $CH_3/1000\ C$ |
|---|---|---|---|---|
| Resin A | 0.940 | 1.0 | 2.07 | 2.6 |
| Resin B | 0.870 | 1.0 | 36.70 | 45.9 |
| Resin C | 0.909 | 1.0 | 13.23 | 16.5 |
| Resin D | 0.885 | 1.0 | 26.77 | 33.5 |
| Resin E | 0.902 | 1.0 | 16.83 | 21.0 |
| Resin F | 0.868 | 0.5 | 36.20 | 45.3 |

The short chains branching per 1000 total carbon are calculated by subtracting the number of methyl groups per 1000 total carbon corresponding to chain ends.

In order to characterize the degree to which the comonomer is concentrated in the high molecular weight part of the polymer, the GPC/IR data were used to calculate a parameter named as comonomer partitioning factor, $C_{pf}$.

(b) Comonomer Partitioning Factor ($C_{pf}$)

The comonomer partitioning factor ($C_{pf}$) is calculated from GPC/FTIR data, as has previously been described in WO 97/44371 which is herein incorporated by reference. It characterizes the ratio of the average comonomer content of the higher molecular weight tractions to the average comonomer content of the lower molecular weight fractions. Higher and lower molecular weight are defined as being above or below the median molecular weight respectively, that is, the molecular weight distribution is divided into two parts of equal weight. $C_{pf}$ is calculated from the following Equation:

$$C_{pf} = \frac{\sum_{i=1}^{n} w_i c_i / \sum_{i=1}^{n} w_i}{\sum_{j=1}^{m} w_j c_j / \sum_{j=1}^{m} w_j}$$

where $c_i$ is the mole fraction comonomer content and $w_i$ is the normalized weight fraction as determined by GPC/FTIR for the n FTIR data points above the median molecular weight. $c_j$ is the mole fraction comonomer content and $wj$ is the normalized weight fraction as determined by GPC/FTIR for the m FTIR data points below the median molecular weight. Only those weight fractions, $w_i$ or $w_j$ which have associated mole fraction comonomer content values are used to calculate $C_{pf}$. For a valid calculation, it is required that n and m are greater than or equal to 3. FTIR data corresponding to molecular weight fractions below 5,000 are not included in the calculation due to the uncertainties present in such data.

Polymers produced using the novel activating supports of the present invention show improved rheological properties. In particular higher viscosities were observed at lower shear rates providing better bubble stability and lower viscosities at higher shear rates resulting in a better processability in the extruder.

Figure 1:
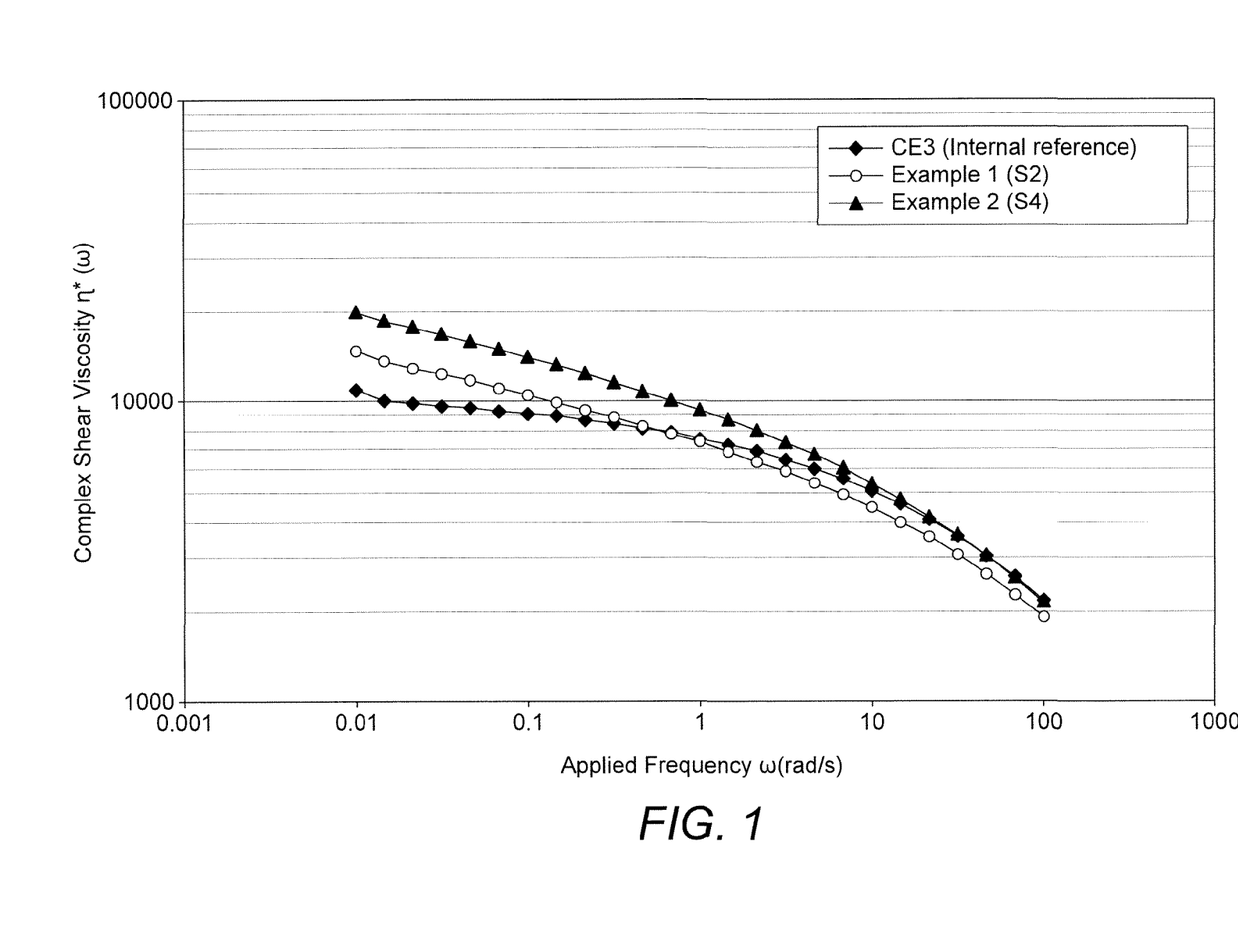
FIG. 1 illustrates the dynamic complex viscosity, $\eta^*(\omega)$, and applied frequency ($\omega$) for polymers prepared in Examples and 2 compared with the internal reference polymer (CE 3)

FIG. 1 illustrates the dynamic complex viscosity, $\eta^*(\omega)$, and applied frequency ($\omega$) for polymers prepared in Examples 1 and 2 compared with the internal reference polymer (CE 3) showing the improved rheology of polymers prepared using the inventive activating supports compared with a traditional supported catalyst system used in the presence of a separate activator.

Figure 2:
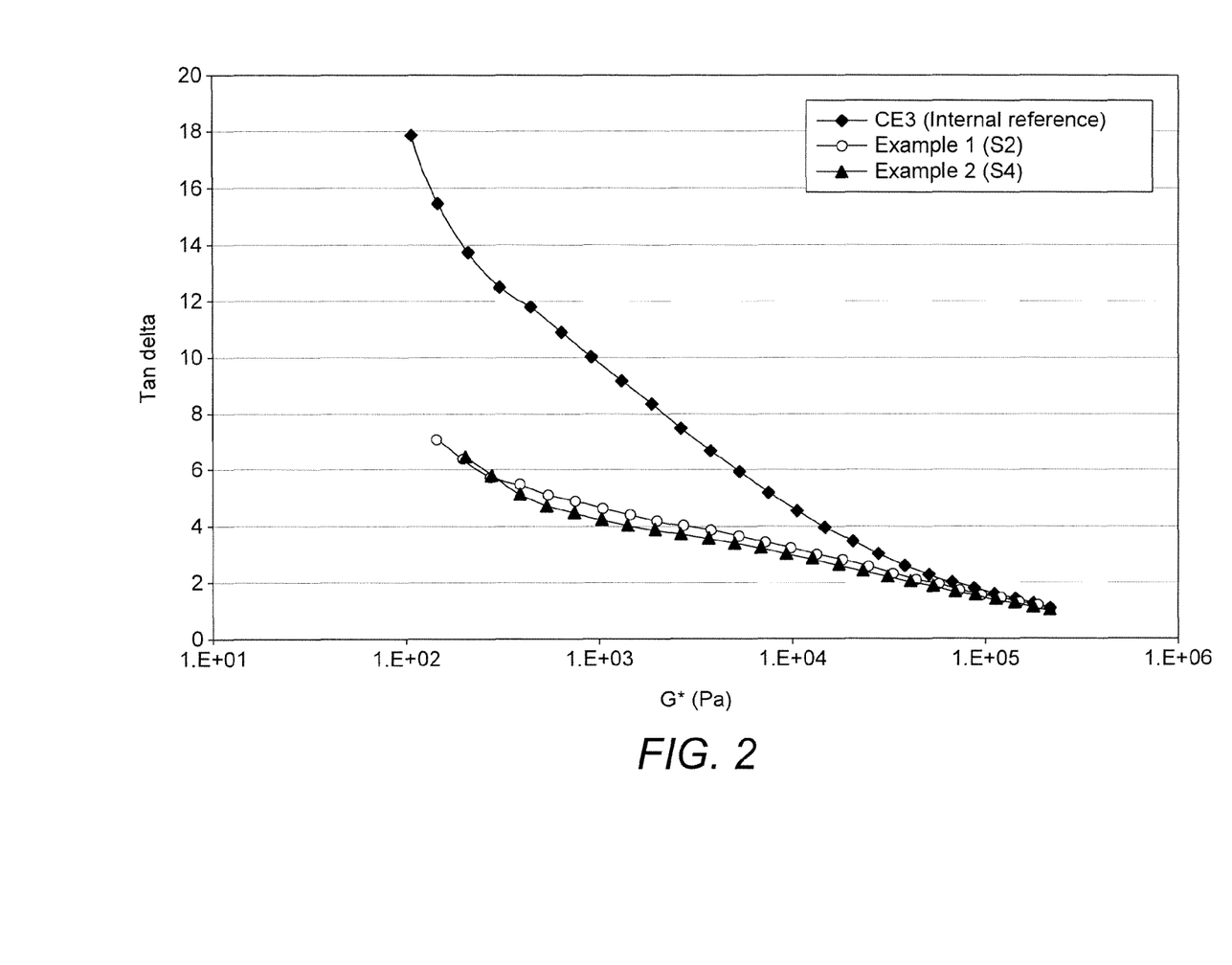
FIG. 2 illustrates the Tan δ (G*) as a function of complex modulus (G*) for polymers produced in Examples 1 and 2 compared with the internal reference polymer from CE 3.

FIG. 2 illustrates the Tan δ ($G^*$) as a function of complex modulus ($G^*$) for polymers produced in Examples 1 and 2 compared with the internal reference polymer from CE 3. Tan δ is a measure of polymer melt elasticity which is related to molecular weight distribution and the level of long chain branching of the polymer. It may be used as a representative of the presence of long chain branching (LCB) in polymers of similar molecular weight distribution (Mw/Mn). Thus, the lower the value of Tan δ the higher will be the melt elasticity and the level of LCB is expected to be higher.

As noted the internal reference polymer was prepared according to WO 05/019275 and represents the use of a catalyst system known to produce polymers having small amounts of LCB.

The presence of LCB also leads to an improved rheology. Thus, the polymers are more processable (extrudable) in the extruder and exhibit good bubble stability particularly suitable for film applications.

The invention claimed is:

1. A copolymer of ethylene and an α-olefin said copolymer having
   (a) a density in the range 0.900-0.940 g/cm$^3$,
   (b) a melt index $MI_2$ (2.16 kg, 190° C.) in the range 0.01-50 g/10 min,
   (c) a molecular weight distribution (Mw/Mn, by conventional GPC) in the range 2.0-4.5,
   (d) a comonomer partition factor, $C_{pf}>1$, and
   (e) a melt index $MI_2$ (2.16 kg, 190° C.) normalised Dow Rheology Index (DRI), [DRI/$MI_2$] in the range 3-20;
   wherein the copolymer exhibits specific rheological behavior and processability characteristics that satisfy the following equation in relating the Dow Rheology Index (DRI) and Shear Thinning Index, SHI (2.1/210),

SHI (2.1/210)≤[0.2351×DRI]+C, with C having a value of 3.4.

2. A copolymer according to claim 1 having a density in the range 0.910 to 0.930 g/cm³.

3. A copolymer according to claim 2 having a density in the range 0.915 to 0.925 g/cm³.

4. A copolymer according to claim 1 having a melt index $MI_2$ (2.16 kg, 190° C.) in the range 0.1 to 25 g/10 min.

5. A copolymer according to claim 4 having a melt index $MI_2$ (2.16 kg, 190° C.) in the range 0.5 to 5 g/10 min.

6. A copolymer according to claim 1 having a molecular weight distribution (Mw/Mn, by conventional GPC) in the range 2.5-4.5.

7. A copolymer according to claim 6 having a molecular weight distribution (Mw/Mn, by conventional GPC) in the range 3.0-4.0.

8. A copolymer according to claim 1 having a [DRI/$MI_2$] in the range 6 to 20.

9. A copolymer according to claim 8 having a [DRI/$MI_2$] in the range 6 to 18.

10. A copolymer according to claim 1 having a comonomer partition factor, $C_{pf}$ in the range 1.1 to 1.50.

11. A copolymer according to claim 10 having a comonomer partition factor, $C_{pf}$ in the range 1.1 to 1.45.

12. A copolymer according to claim 1 having a melt elastic modulus G'(G"=500 Pa) at 190° C. in the range 40 to 150 Pa.

13. A copolymer according to claim 1 having a melt elastic modulus G'(G"=500 Pa) at 190° C. in the range 65 to 150 Pa.

14. A copolymer according to claim 13 having a melt elastic modulus G'(G"=500 Pa) at 190° C. in the range 70 to 105 Pa.

15. A copolymer according to claim 1 having a Dow Rheology Index (DRI)≥6.

16. A copolymer according to claim 15 having a Dow Rheology Index (DRI) in the range 9-25.

17. A copolymer according to claim 15 having a Dow Rheology Index (DRI) in the range 13-25.

18. A copolymer according to claim 15 having a Dow Rheology Index (DRI) in the range 13-20.

19. A copolymer according to claim 1 wherein C has a value of 3.0.

20. A copolymer according to claim 1 wherein C has a value of 2.7.

21. A copolymer according to claim 1 wherein the copolymer is monomodal.

22. A copolymer according to claim 1 wherein the α-olefin has 3 to 10 carbon atoms.

23. A copolymer according to claim 1 wherein the α-olefin is 1-hexene.

24. A process for the preparation of copolymers according to claim 1 comprising copolymerising ethylene and α-olefins in the presence of a catalyst system comprising
 (a) a transition metal compound, and
 (b) an activated support.

25. A process according to claim 24 wherein the activated support is a fluorinated support.

26. A process according to claim 25 wherein the support comprises silica.

27. A process according to claim 24 wherein the transition metal compound is a metallocene.

28. A process according to claim 24 performed in the gas phase.

29. A process according to claim 24 performed in a single reactor.

* * * * *